(12) United States Patent
LaBarbera et al.

(10) Patent No.: US 10,299,653 B2
(45) Date of Patent: May 28, 2019

(54) DISK WITH ENGAGEMENT SYSTEM FOR SURFACE CLEANING MACHINE

(71) Applicant: MYTEE PRODUCTS, INC., Poway, CA (US)

(72) Inventors: John LaBarbera, Poway, CA (US); Vincent LaBarbera, Poway, CA (US)

(*) Notice: Subject to any disclaimer, the term of this patent is extended or adjusted under 35 U.S.C. 154(b) by 11 days.

(21) Appl. No.: 15/660,889

(22) Filed: Jul. 26, 2017

(65) Prior Publication Data
US 2018/0289232 A1    Oct. 11, 2018

Related U.S. Application Data

(60) Provisional application No. 62/483,355, filed on Apr. 8, 2017.

(51) Int. Cl.

| | |
|---|---|
| A47L 11/16 | (2006.01) |
| A47L 11/40 | (2006.01) |
| B24B 7/18 | (2006.01) |
| B24B 45/00 | (2006.01) |
| F16B 1/00 | (2006.01) |
| B24B 41/047 | (2006.01) |
| B24D 9/08 | (2006.01) |

(52) U.S. Cl.
CPC ........... A47L 11/4038 (2013.01); A47L 11/16 (2013.01); B24B 7/186 (2013.01); B24B 41/047 (2013.01); B24B 45/006 (2013.01); B24D 9/08 (2013.01); F16B 1/00 (2013.01); F16B 2001/0035 (2013.01)

(58) Field of Classification Search
CPC ...... A47L 11/4038; A47L 11/16; B24B 7/186; B24B 45/006; F16B 2001/0035
See application file for complete search history.

(56) References Cited

U.S. PATENT DOCUMENTS

| | | | | |
|---|---|---|---|---|
| 3,354,488 A | * | 11/1967 | Bilde | A47L 11/16 |
| | | | | 15/230.19 |
| 2014/0223678 A1 | * | 8/2014 | Chiu | A47L 11/4066 |
| | | | | 15/98 |

FOREIGN PATENT DOCUMENTS

CA    2 490 460   * 7/2005

* cited by examiner

*Primary Examiner* — Randall Chin
(74) *Attorney, Agent, or Firm* — Themis Law

(57) ABSTRACT

A disk with an engagement system for a surface cleaning machine includes a disk having an upper surface, a lower surface, a perimetric edge, and a retaining cavity defined in the disk; an engaging member having a base and a perimetric wall, which is configured to be nested in the retaining cavity of the disk and to entrain an inner wall of the retaining cavity; a first metallic member housed within the disk; and a second metallic member housed within the engaging member. The first and the second metallic members are magnetically attracted to one another with a force that is larger than the gravity force of the disk and smaller than a predetermined detaching force of the disk from the engaging member.

14 Claims, 6 Drawing Sheets

DISK WITH ENGAGEMENT SYSTEM FOR SURFACE CLEANING MACHINE

FIELD OF THE INVENTION

The present invention relates to a disk with an engagement system for a surface cleaning machine. More particularly, the present invention relates to a disk with a quick change engagement system that is especially suited for an orbital surface cleaning machine.

BACKGROUND OF THE INVENTION

Surface cleaning machines have been used for years to clean floors, drapes and upholstery. One common type of surface cleaning machines include a housing with an elongated handle angled toward a user, a rotary drive system, and a disk carrying a treatment element such as a polishing or stripping pad or a brush.

Surface cleaning machines with orbital motion have been found to be particularly effective for polishing or stripping surfaces. The orbital motion is typically imparted by a drive assembly that transmits a torque through a drive assembly that is eccentrically mounted on a drive shaft linking the rotary drive system to the disk. Examples of rotary cleaning machines with orbital motion are disclosed in U.S. Pat. No. 5,355,542 to Oreck et al., U.S. Pat. No. 6,938,295 to Lancaster et al., and U.S. Pat. No. 8,839,479 to Hruby.

One drawback of surface cleaning machines in the prior art, in particular of surface cleaning machine with orbital motion, is that the change-over from one type of disk to another is slow and cumbersome. Typically, the operator must angle the machine to gain access to the screws that attach the drive assembly to the disk; remove the disk; position a different disk in place; and re-attach the screws.

Therefore, it would be an improvement over the prior art to have a disk with an engagement system to the drive assembly that is configured to provide for a quick and less cumbersome changeover.

BRIEF SUMMARY OF THE INVENTION

The present invention relates to a disk with an engagement system for a surface cleaning machine that provides for a quicker and less cumbersome change-over from one type of disk to another than surface cleaning machines in the prior art.

In one embodiment, a disk with an engagement system according to the invention includes a disk having an upper surface, a lower surface, a perimetric edge, and a retaining cavity defined within the disk; and an engaging member having a base and a perimetric wall, which is configured to be nested in the retaining cavity of the disk and to entrain an inner wall of that retaining cavity, causing the disk to rotate. A first metallic member is housed within the disk, which is magnetically attracted to a second and a second metallic member housed within the engaging member, with a force of attraction that is larger than the gravity force of the disk but smaller than a predetermined detaching force of the disk from the engaging member.

The retaining cavity in the disk may be defined by a multi-faceted retaining wall that extends upwardly from the upper surface of the disk, and the perimetric wall of the engaging member may be multi-faceted and shaped to nest within the inner wall of the retaining cavity.

In one embodiment, the multi-faceted perimetric wall of the engaging member is inwardly inclined in relation to the multi-faceted retaining wall on the disk, facilitating the nesting of the engaging member within the cavity and reducing vibration during rotation about a longitudinal axis.

Outer ribs may be disposed outside of the retaining wall to support it, and inner ribs may also be disposed within the engaging member to supporting its perimetric wall.

The first metallic member is housed within a cavity in the upper surface of the disk and the second metallic member is housed in a cavity in an upper side of the base of the engaging member. The two metallic members are longitudinally aligned when the engaging member is nested within the retaining cavity on the disk. The cavity housing the second metallic member may have a depth that is less than the thickness of base of the engaging member, so that the first and second the metallic members are longitudinally spaced from one another by the residual thickness of the base of the engaging member. In one embodiment, the first and the second metallic members are magnets and may be engaged in the respective cavities with a fastener, by adhesive binding, or by interference fit.

In one embodiment, the engaging member has a plurality of protrusions extending from its lower side, and the disk has a plurality of openings sized and positioned to receive the plurality of protrusions extending from the engaging member. Those protrusions may have a downwardly narrowing frusto-conical shape to facilitate insertion into the openings in the disk and reduce vibrations.

In one embodiment, the disk has a plurality of through-openings that drain a fluid that becomes lodged on the upper surface of the disk during use of the surface cleaning machine, and may further have a raised lip at its perimetric edge that contains the same fluid.

A plurality of slots are defined in the base of the engaging member to receive attachment screws of a drive assembly of the surface cleaning machine. Those slots may include larger slots and smaller slots arranged in different patterns for receiving attachment screws of different drive assemblies. The disk may also have slots in longitudinally aligned positions with the slots in the base of the engaging members, in the event that a machine operator elects not to use the engaging system and attach the drive assembly directly onto the disk.

It is an advantage of the present invention to provide a disk for a surface cleaning machine that can be engaged and detached from the surface cleaning machine quickly and with minimum effort.

It is another advantage of the present invention to provide a disk for a surface cleaning machine with an engagement system that enables use of different types of drive assemblies.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
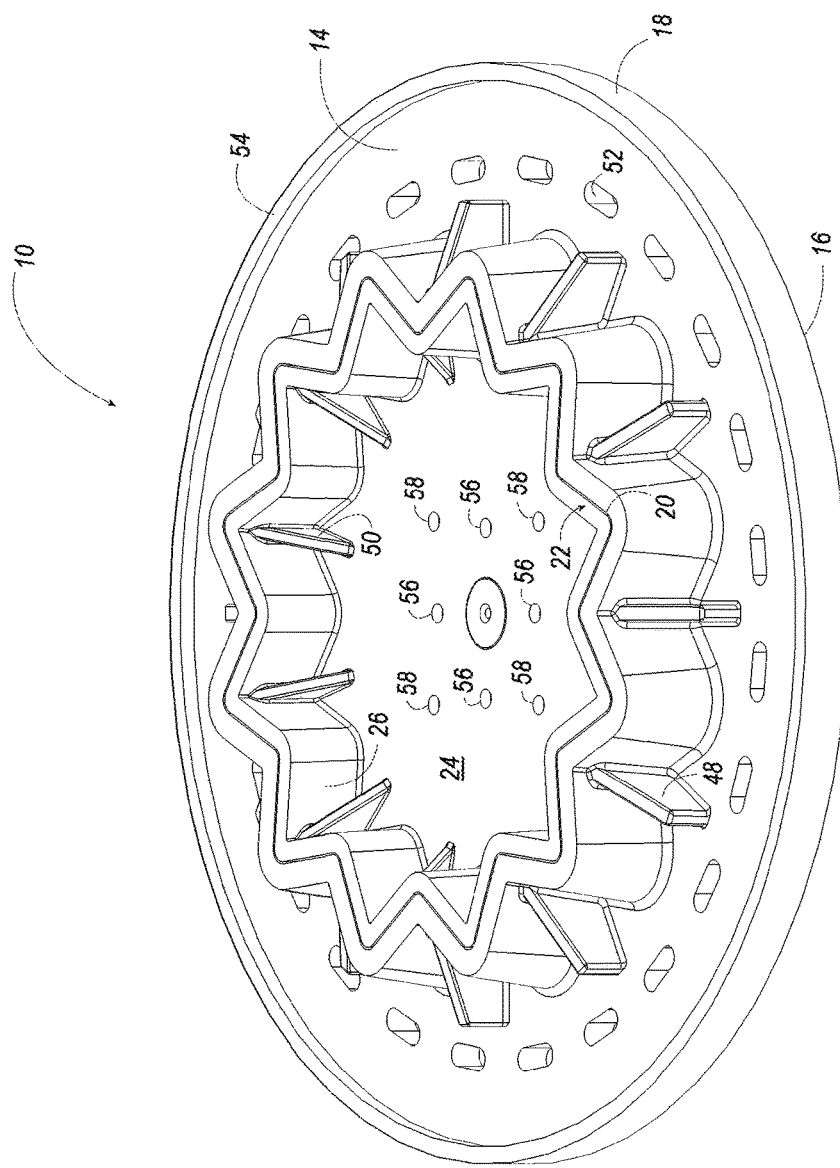
FIG. 1 is a perspective view of a disk with an engagement system for a surface cleaning machine according to an embodiment of the invention.
Figure 2:
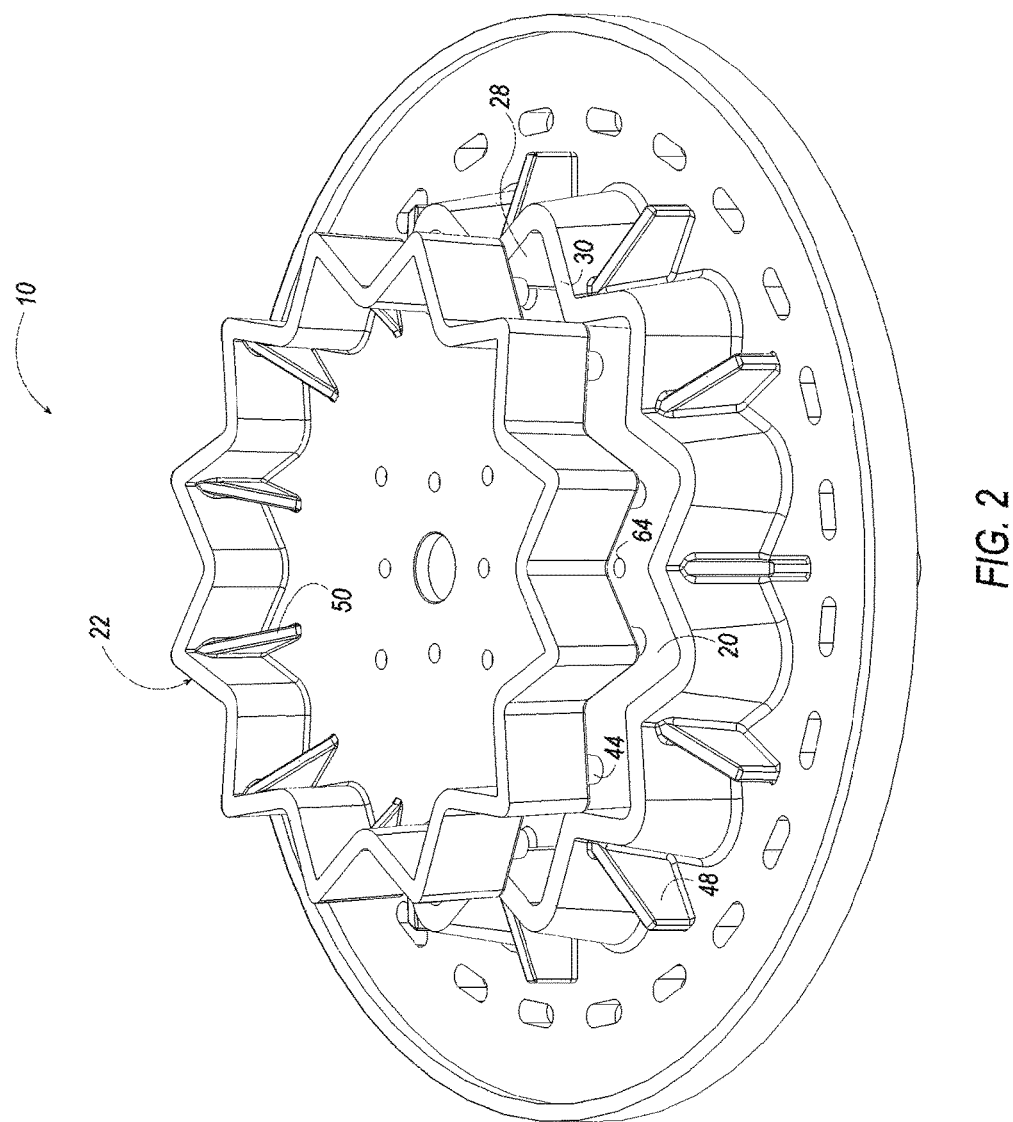
FIG. 2 is a first exploded view of the disk with engagement system of FIG. 1.
Figure 3:
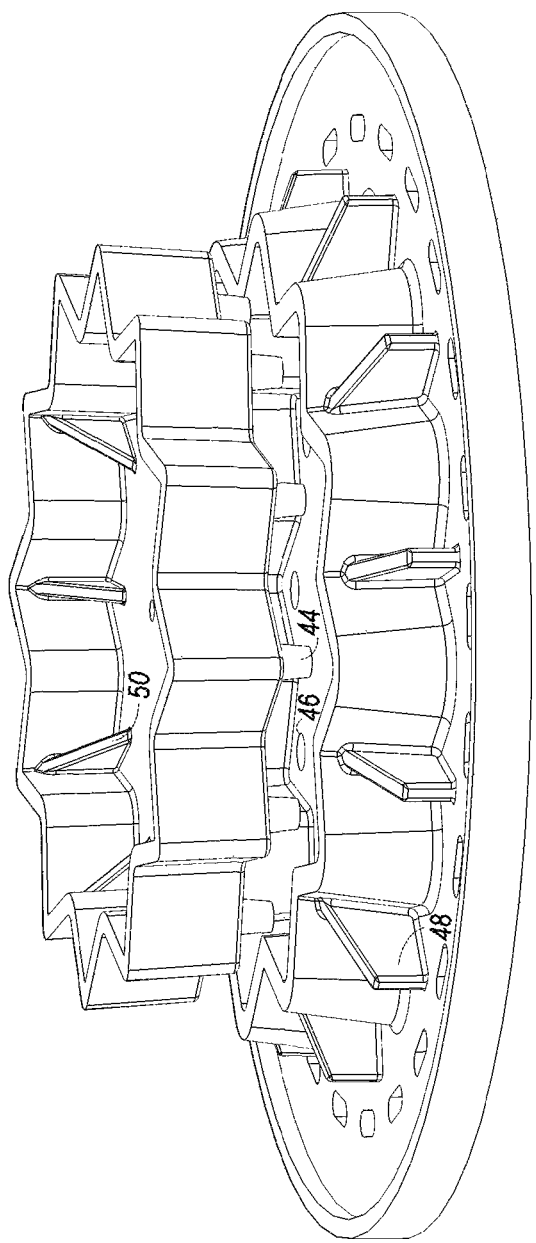
FIG. 3 is a second exploded view of the disk with engagement system of FIG. 1.

Turning first to FIGS. 1-3, there is shown a disk with an engagement system 10 according to an embodiment of the invention. This disk is particularly suited for use with a surface cleaning machine, for example, an orbital floor cleaning machine. A disk according to the invention may be coupled with a pad or other attachment for cleaning carpet or grout, or may be coupled with a diamond pad or puck for surface burnishing, polishing, or maintenance.

Disk with engagement system 10 includes a disk 12, which is defined by an upper surface 14, a lower surface 16, and a perimetric edge 18. A retaining cavity 20 is defined on upper surface 14 and is shaped to receive an engaging member 22.

Engaging member 22 includes a base 24 and a perimetric wall 26 and is configured to be nested within retaining cavity 20 of disk 12 and to entrain an inner all 28 of retaining cavity 20. The combination of cavity 20 and engaging member 22, together with the metallic members disclosed hereafter, provides for the engagement system of disk 12.

In the embodiment depicted in FIGS. 1-3, retaining cavity 20 is defined by a multi-faceted retaining wall 30 that extends upwardly from upper surface 14 of disk 12 and that is star-shaped. Perimetric wall 26 of engaging member 22 is also multi-faceted and shaped to be nested within retaining wall 30 of disk 12, so that a rotation of engaging member 22 will cause disk 12 to rotate also. A person of skill in the art will recognize that the number of segments of multifaceted retaining wall 30 and multi-faceted perimetric wall 26 may vary in different embodiments of the invention and may be selected by the skilled artisan according to the size of disk 12 and the amount of torque to be transmitted.

In one embodiment, perimetric wall 26 of engaging member 22 is inclined inwardly, that is, is inclined toward the longitudinal axis of disk 12. Such inclination facilitates insertion of engaging member 22 into cavity 20 due to the gap between the lower portion of perimetric wall 26 and inner wall 28 of cavity 20. At the same time, this construction reduces vibration during rotation of the assembly because of the minimal or zero gap between the upper portion of perimetric wall 26 and inner wall 28.

Figure 4:
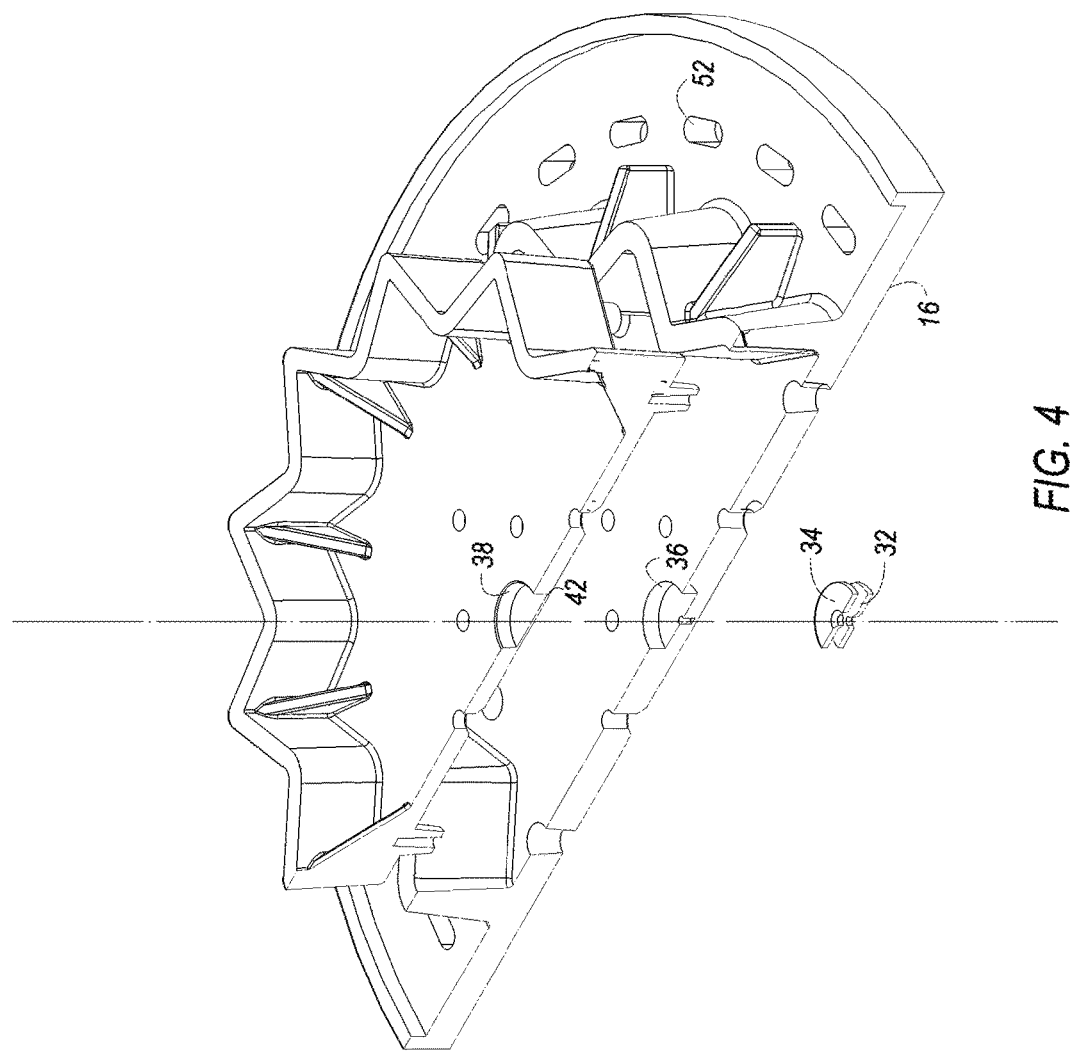
FIG. 4 is a cross-sectional view of the disk with engagement system of FIG. 1.
Figure 6:
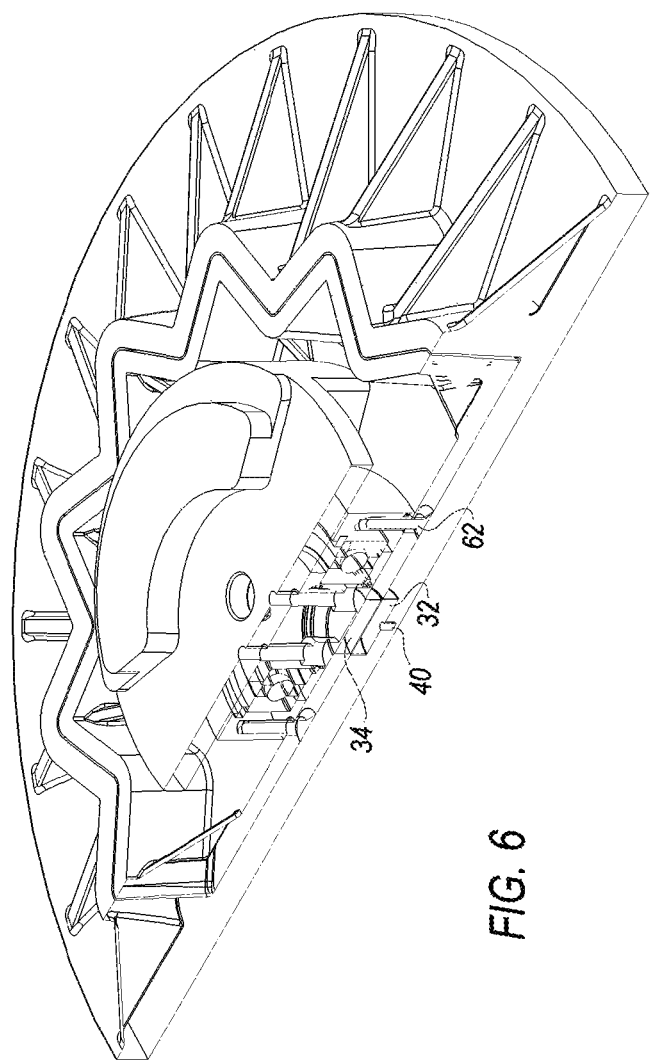
FIG. 6 is a cross-sectional view of the disk with engagement system and drive assembly of FIG. 6.

In another aspect of the invention, shown more clearly in FIGS. 4 and 6, a first metallic member 32 is housed in upper surface 14 of disk 12, preferably at the center, and a second metallic member 34 is housed in base 24 of engaging member 22, in a longitudinally aligned position with first metallic member 34. First metallic member 32 and second metallic member 34 are magnetically attracted to one another, for example, are both magnets that attract each other.

First metallic member 32 and second metallic member 34 are selected to have a magnetic attraction that is larger than the gravity force of disk 12 so that, when an operator tilts or lifts the lower portion of the surface cleaning machine to which disk 12 is coupled, disk 12 remains engaged to engaging member 22. At the same time, the magnetic attraction is sufficiently low to enable an operator to disengage disk 12 from engagement member 22 by pulling disk 12 away, preferably by pulling disk 12 at one point of perimetric edge 18 and causing disk 12 to pivot around one point of retaining wall 30.

First metallic member 32 is disposed in a first housing 36 defined in upper surface 14 of disk 12, and second metallic member 34 is disposed in a second housing 38 defined in the upper face of base 24 of engaging member 22. First metallic member 32 and respectively second metallic member 34 may retained in first housing 36 and respectively second housing 38 in a variety of ways, for example, with a fastener such as a screw 40, by adhesive bonding, by interference fit, or in other ways known to a person of skill in the art.

Preferably, second housing 38 does not extend through the entire thickness of base 34, leaving a residual thickness 42 to space first metallic member 32 from second metallic member 34.

Turning now to FIGS. 2-4, engaging member 22 may include a plurality of protrusions 44 that engage a corresponding plurality of openings 46 defined on disk 12. The engagement of protrusions 44 with openings 46 provides for proper positioning of engaging member 22 within retaining cavity 20 and increases the entraining torque of engaging member 22 on disk 12. In one embodiment, protrusions 44 have downwardly narrowing frusto-conical shapes that facilitate introduction into openings 46 and that further reduce vibrations during rotation of the assembly due to the contact, or the close proximity, between the upper portions of protrusions 44 and the edges of openings 46. In one embodiment, protrusions 44 are hollow.

In different embodiments, a plurality of outer ribs 48 may be disposed at the apices of the multi-faceted wall of retaining cavity 20 to stiffen it. Conversely, a plurality of inner ribs 50 may be disposed at the apices of perimetric wall 26 to stiffen it. Inner ribs 50 may be provided in addition to, or in alternative to, outer ribs 48.

In the described embodiment, a plurality of through-openings 52 is defined in disk 12, as shown in FIGS. 1-4. The purpose of through-openings 52 is to drain fluid that may accumulate on upper surface 14 of disk 12 during use of the surface cleaning machine. Perimetric edge 18 of disk 12 may also include an upperly raised lip 54 that prevents the tangential escape of any fluid lodged on upper surface 14 of disk 12.

Figure 5:
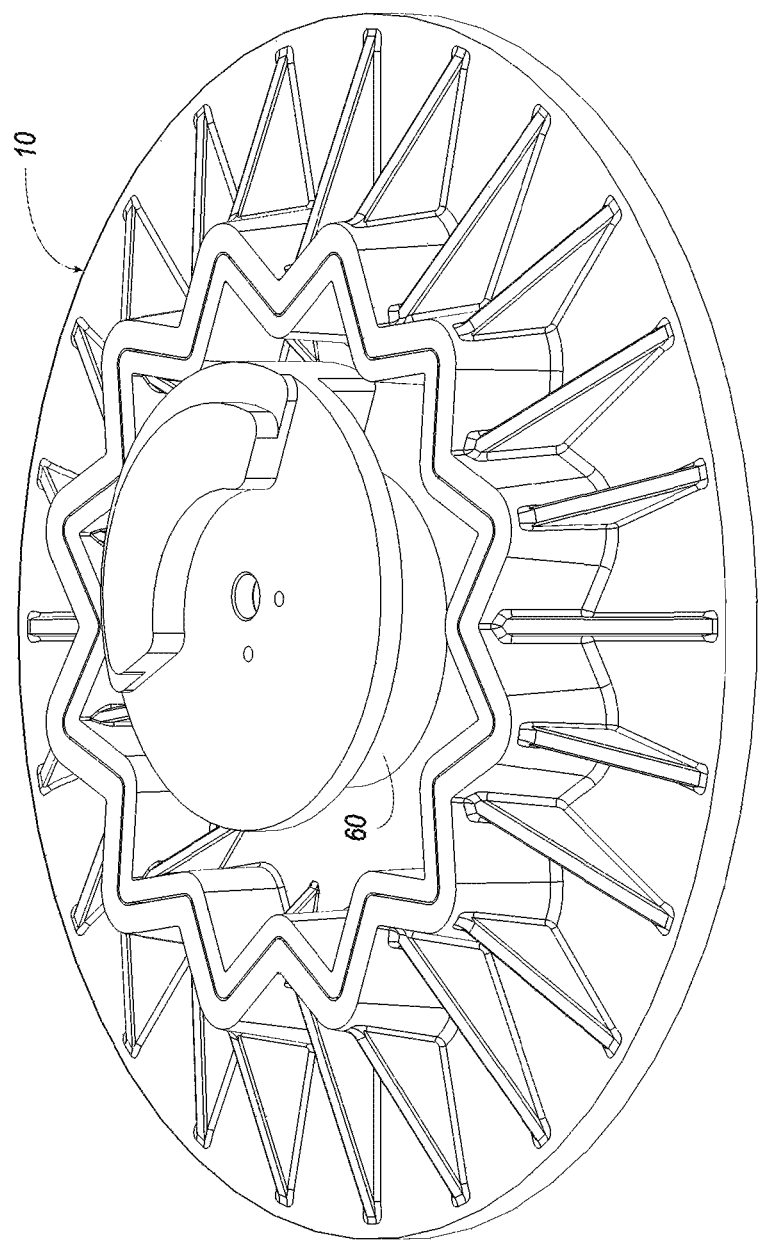
FIG. 5 is a perspective view of the disk with engagement system of FIG. 1, with a drive assembly coupled thereto.

Turning now to FIGS. 1 and 5, a plurality of smaller slots 56 and larger slots 58 are defined in base 24 of engaging member 22 to receive attachment screws of a drive assembly 60 of the surface cleaning machine. The availability of smaller slots 56 and larger slots 58 enables accommodating different types of drive assemblies 60 that require different types of attachment screws.

As shown in FIG. 2, slots 64 are also provided in disk 12, in the event that an operator elects not to use engaging member 22 and attach drive assembly 60 directly onto disk 12. Slots 64 are of the same types and in the same positions as slots 56 and 58.

Disk 12 and engaging member 22 may be manufactured from a variety of materials. In one embodiment, disk 12 and engaging member 22 are manufactured from a reinforced plastic, but a person of skill in the art will appreciate that disk 12 and engaging member 22 may be manufactured from other materials as well, for example, cast metal.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A disk with an engagement system for a surface cleaning machine comprising:
    a disk having an upper surface, a lower surface and a perimetric edge, the disk having a retaining cavity defined therein;
    an engaging member having a base and a perimetric wall, the engaging member being configured to be nested in the retaining cavity and to entrain an inner wall of the retaining cavity;
    a first metallic member housed within the disk; and
    a second metallic member housed within the engaging member,
    wherein the first and the second metallic members are magnetically attracted to one another, and
    wherein the first and the second magnetic members are selected to have a magnetic attraction that is larger than a gravity force of the disk and smaller than a predetermined detaching force.

2. The disk of claim 1, wherein the retaining cavity in the disk is defined by a multi-faceted retaining wall extending upwardly from the upper surface of the disk, and the perimetric wall of the engaging member is a multi-faceted side wall shaped to nest within the retaining wall.

3. The disk of claim 2, wherein the multi-faceted side wall of the engaging member is inwardly inclined in relation to the multi-faceted retaining wall, thereby facilitating nesting of the engaging member within the cavity and reducing vibration during rotation about a longitudinal axis.

4. The disk of claim 1, further comprising outer ribs disposed outside of the retaining wall and supporting the retaining wall.

5. The disk of claim 1, further comprising inner ribs disposed within the engaging member and supporting the perimetric wall.

6. The disk of claim 1, wherein the first metallic member is housed within a first cavity defined in the upper surface of the disk and the second metallic member is housed in a second cavity defined in an upper side of the base of the engaging member, the first and the second magnets being longitudinally aligned when the engaging member is nested within the retaining cavity and spaced from one another by a residual thickness of the base of the engaging member.

7. The disk of claim 1, wherein the first and respectively the second metallic members are engaged in the first and the second cavity with a fastener, by adhesive binding, or by interference fit.

8. The disk of claim 1, wherein the engaging member comprises a plurality of protrusions extending from a lower side of the base, and wherein the disk has a plurality of openings sized and positioned to receive the plurality of protrusions.

9. The disk of claim 8, wherein the protrusions have a downwardly narrowing frusto-conical shape, thereby facilitating insertion into the openings and reducing vibrations.

10. The disk of claim 1, wherein the disk has a plurality of through-openings defined therein that drain a fluid lodged on the upper surface of the disk.

11. The disk of claim 1, wherein the perimetric edge of the disk has a raised perimetric lip that contains a fluid lodged in the upper surface of the disk.

12. The disk of claim 1, wherein a plurality of slots are defined in the base of the engaging member, the plurality of slots being configured to receive attachment screws of a drive assembly of the surface cleaning machine.

13. The disk of claim 12, wherein a plurality of slots are defined in the disk, the plurality of slots being configured to receive attachment screws of a drive assembly of the surface cleaning machine.

14. The disk of claim 12, wherein the plurality of slots comprise larger slots and smaller slots, the larger and smaller slots being arranged in different patterns for receiving attachment screws of different drive assemblies.

* * * * *